May 19, 1964  A. K. DORSMAN  3,134,006
TEMPERATURE CONTROL SYSTEM

Filed Oct. 3, 1960  4 Sheets-Sheet 1

*INVENTOR.*
ADRIAN K. DORSMAN
BY *Allen Rothenberg*

ATTORNEY

May 19, 1964 A. K. DORSMAN 3,134,006
TEMPERATURE CONTROL SYSTEM
Filed Oct. 3, 1960 4 Sheets-Sheet 2

*INVENTOR.*
ADRIAN K. DORSMAN
BY *Allan Rothenberg*
ATTORNEY

May 19, 1964  A. K. DORSMAN  3,134,006
TEMPERATURE CONTROL SYSTEM
Filed Oct. 3, 1960  4 Sheets-Sheet 3

INVENTOR.
ADRIAN K. DORSMAN
BY Allan Rothenberg
ATTORNEY

May 19, 1964   A. K. DORSMAN   3,134,006
TEMPERATURE CONTROL SYSTEM
Filed Oct. 3, 1960   4 Sheets-Sheet 4

*INVENTOR.*
ADRIAN K. DORSMAN
BY Allan Rothenberg
ATTORNEY

United States Patent Office 3,134,006
Patented May 19, 1964

3,134,006
TEMPERATURE CONTROL SYSTEM
Adrian K. Dorsman, Bellflower, Calif., assignor to
North American Aviation, Inc.
Filed Oct. 3, 1960, Ser. No. 59,965
11 Claims. (Cl. 219—20)

This invention relates to condition sensing and control systems and particularly concerns an improved apparatus for the precision control of temperature.

The high precision temperature control system of this invention is applicable to gyros, crystal ovens, stable platform environmental housings, laboratory reference baths, and the like. In a power generating device such as a gyro which is cooled by an external air blast or is subject to heat flow from a near-by hot body, there exists a diametral temperature difference. The performance of a floated instrument such as the floated gyro described in Patent No. 2,958,522 for Sectional Stable Platform, issued November 1, 1960, by J. M. Slater, is greatly impaired by such diametral temperature difference because of the resulting convection torques on the float. An air flow over such an instrument causes an unbalance in the air film coefficient across a diameter parallel to the air flow. This unbalance in air film coefficient causes a different thermal resistance on each side of the instrument which results in asymmetric heat flow and diametral temperature differences. Such conditions result in unwanted and disturbing convection torques in the flotation fluids. In precision floated instruments diametral temperature differences of less than 0.01 degree are required. Thus, it is an object of this invention to provide a dynamic temperature difference controller.

In a closed loop temperature control system, as in any closed loop system, stability is of primary concern. Where a temperature control system provides a nonlinear output, there is poor control at low gain and a tendency toward oscillation at high gain. These conditions make for difficulties in the design of such systems for stability.

Accordingly, it is a further object of this invention to provide a temperature control amplifier system whose output is a linear function of the sensed input temperature.

In carrying out the principles of this invention, as exemplified in the temperature control of a floated gyro, there is provided a first controlling means which establishes the temperature of one portion of the gyro at a preselected value. A second controlling means is referenced from the temperature of said one portion and establishes the temperature of a second portion of the device in accordance with the temperature of the first portion. Thus, one part of the sensitive instrument is temperature slaved to another part thereof, and the latter is controlled with respect to some predetermined temperature.

For most efficiently achieving the precision requirements, there is provided a closed loop linear temperature control system including an A.-C. excited temperature responsive bridge, an amplifier responsive to the bridge, a phase sensitive demodulator responsive to the amplifier, a pulse width modulating means responsive to the demodulator for generating output pulses having a width linearly related to the demodulator output, and a power amplifier which is energized by the variable width pulses whereby the output of the power amplifier is a linear function of temperature variation sensed by the bridge. A heater is energized by the power amplifier.

For differential control, two or more of these closed loop temperature control systems are provided, one loop being a master loop which controls temperature of one portion to a predetermined value, while one or more additional loops are slave loops which control temperature of their respective areas in accordance with the temperature as controlled by the master loop.

For the purpose of providing increased efficiency, linearity, and minimum volume and weight, each loop will preferably embody an improved pulse width modulator which comprises a saturable core reactor and a cyclically operable switch caused to repetitively apply and remove a modulating signal to and from the reactor. In order to avoid the difficulties inherent in an externally applied readout switching voltage, the modulator embodies a self-triggered readout switching device which drives the reactor to saturation in response to removal of the modulating signal from the reactor, and is further operable to cut off the saturating current from the reactor when the latter does reach saturation.

Thus, it will be seen that an additional feature of this invention resides in the provision of an improved precision temperature control system having an overall configuration of increased efficiency and accuracy and embodying improved components which specifically contribute to the improvement of the entire system.

Another object of the invention is to provide a temperature control system of a circuit configuration which is adaptable to different controllers which have substantially varying power requirements.

Another object of the invention is to provide a temperature control system which exhibits low drift in temperature control point with varying ambient temperatures and supply voltages.

Still another object of the invention is to provide a temperature control amplifier capable of rejecting noise which may be introduced at the sensing bridge and in the connection cables whereby proper operation in the presence of such noise is achieved.

A further object is the provision of a temperature control system which is operable from a primary unregulated power supply and is simple, reliable and inexpensive.

These and other objects of the invention will become apparent from the following description taken in connection with the accompanying drawings in which.

Figure 7:
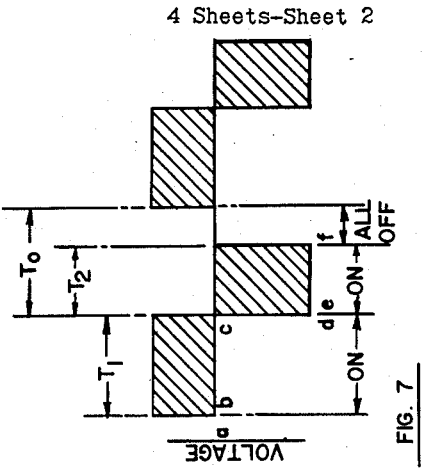
Figure 6:
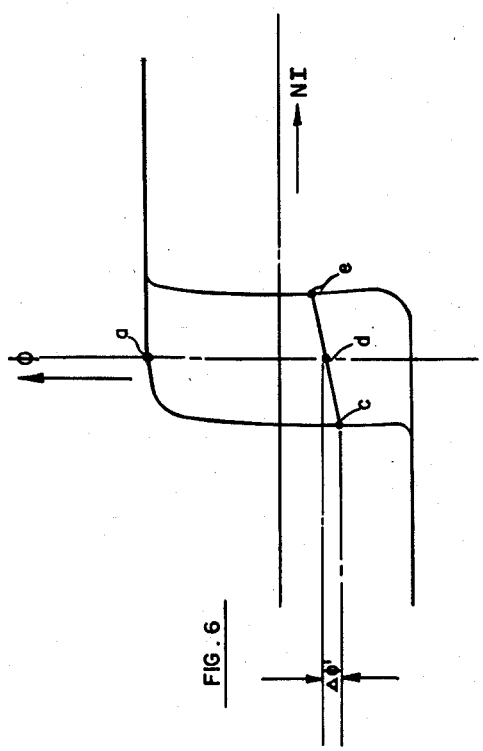
Figure 5:
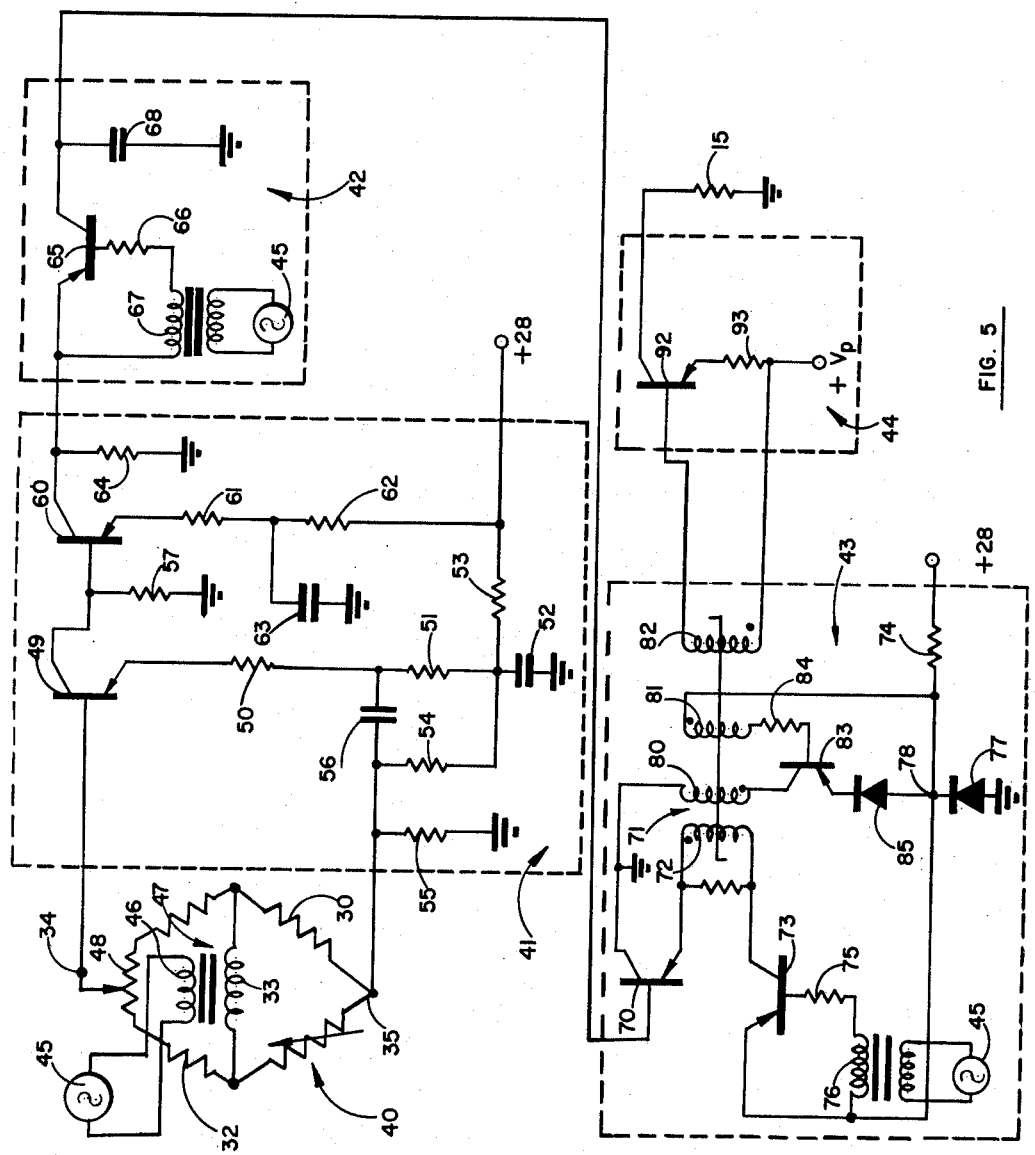
Figure 8:
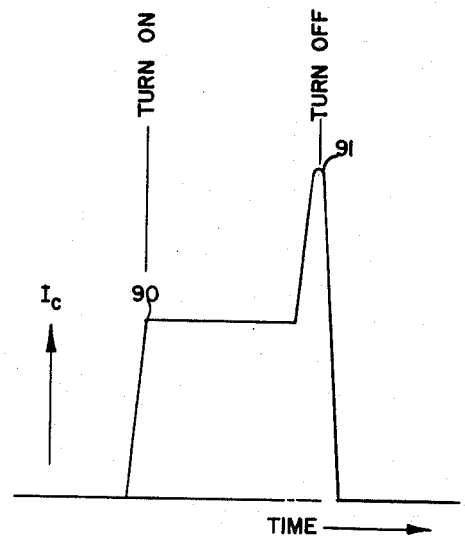

FIG. 5 comprises the circuit diagram of one of the control loops;

FIG. 6 is a graph illustrating operation of the pulse width modulator;

FIGS. 7 and 8 illustrate certain waveforms of the pulse width molulator; and

Figure 9:
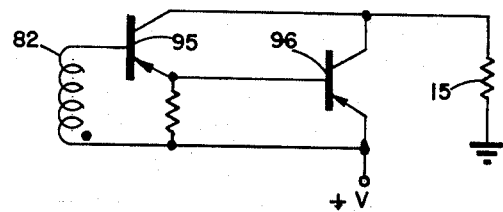
Figure 10:
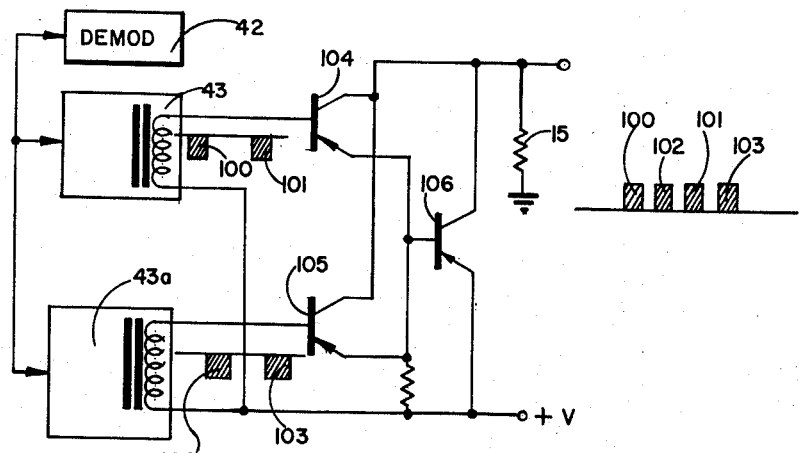
Figure 11:
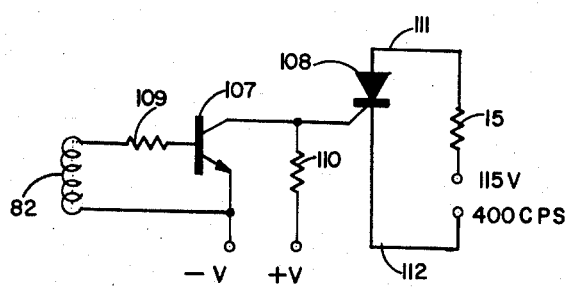

FIGS. 9, 10 and 11 illustrate alternative forms of the power output stage.

In the drawings like reference characters refer to like parts.

Figure 1:
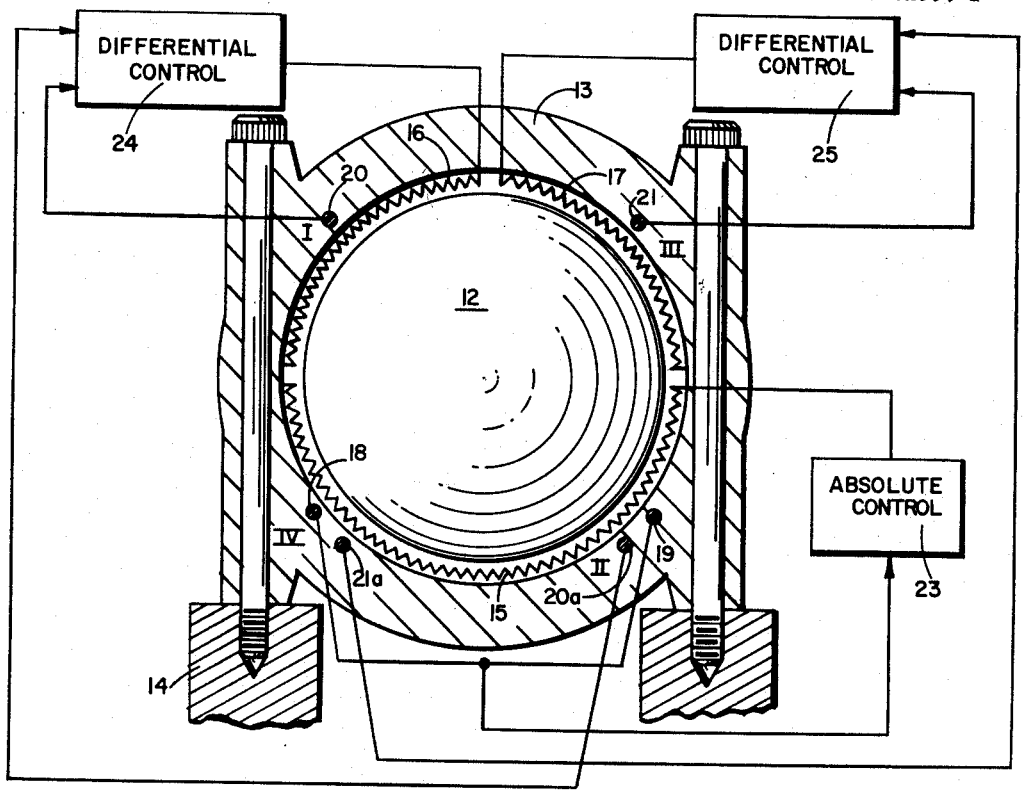
FIG. 1 illustrates a section of a floated gyro and an arrangement of heater and sensing elements thereon, together with functional connections of differential and absolute controllers.

As illustrated in FIG. 1, a gyro shown in cross-section may include a spherical floated member 12 mounted in a spherical case 13 which is bolted to a support 14. The float contains the gyro rotor (not shown). A small amount of clearance is provided between the float 12 and case 13 for confining a flotation fluid of sufficient density to take most of the load from bearings (not shown) which support the floated element from the case. A master heating element 15 is mounted in intimate contact with the inner surface of the case 13. This element extends over and substantially covers a first portion of the gyro which is of substantially hemispherical extent. This hemisphere is designated by quadrants II and IV in FIG. 1. There is also provided a pair of slave heating elements 16 and 17 extending over second and third portions of the gyro which cover the two remaining quadrants I and III of the sphere. A pair of temperature sensitive elements such as thermistors 18, 19 are imbedded or otherwise suitably secured in intimate contact with the inner surface of the gyro case (see also FIG. 2) within the area covered by the hemispherical heater element 15. These thermistors 18 and 19 are the sensing elements of a master loop which controls the master heater element 15 through absolute controller 23. For control of the slave elements 16 and 17 there are provided thermistors 20 and 21. For the purpose of providing a temperature reference from the master loop to each of the slave loops, there is provided a thermistor 20a operating in conjunction with thermistor 20, and a thermistor 21a operating in conjunction with thermistor 21, as will be more particularly described below.

Figure 2:
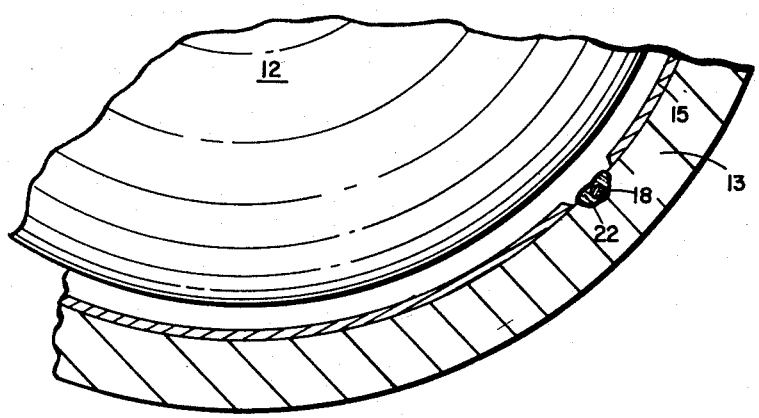
FIG. 2 illustrates details of the relation between the gyro and heating and sensing elements.

As illustrated in FIG. 2, each thermistor, such as thermistor 18, is preferably of a ceramic material imbedded in a ceramic cement 22 in intimate contact with the inner surface of the gyro case. Thus, the thermistor is able to precisely sense the temperature of the area since it is essentially a part of the surface itself. Each of the heaters, such as heater 15 illustrated in FIG. 2, is preferably of a surface film type which provides the ultimate in transfer efficiency and introduces a minimum of transport lag. While a conventional resistance wire type of heating element may be suitably secured to the surface of the gyro case, the film type of resistor is preferred in connection with uniformity of heating transfer efficiency, capacity, time constant, space required, and cost. Since a film type heater generates heat uniformly over all of the area to which it is applied, an even temperature distribution is obtained, eliminating local hot spots and causing a minimum of temperature gradients.

The film heater is sprayed directly on the surface to which it is attached and operates all of the time at approximately the same temperature as the surface.

Figure 3:
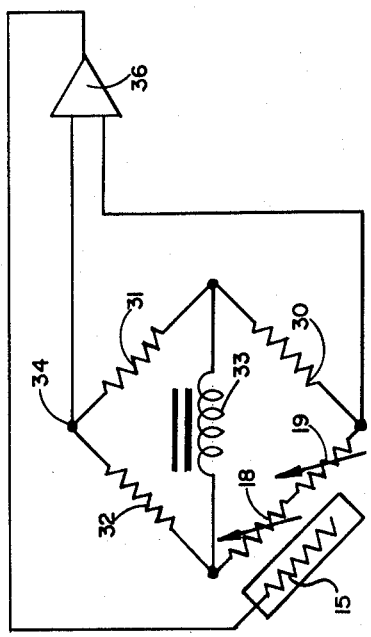

As illustrated in FIG. 3, the master control loop employs the thermistors shown here as variable resistors 18 and 19 in one leg of a temperature sensitive bridge which includes fixed resistors 30, 31 and 32. The bridge is energized by an alternating current from the secondary 33 of a transformer having its primary connected to a suitable source of potential 45 (FIG. 5). The provision of a pair of thermistors 18, 19 in this master loop achieves an averaging action over the quadrants II and IV. Thus, the output from terminals 34, 35 of the bridge is an alternating-current signal at the frequency of the source which is amplitude modulated by the deviation of the sensed temperature from a predetermined value and which has a polarity relative to the phase of the source, depending upon the sense of the temperature variation. The bridge output signal is fed through amplifying circuitry 36 which will be more particularly described hereinafter to provide an energizing control signal for the heater 15 whereby the temperature of the two gyro quadrants covered by the heater 15 is precisely controlled according to scale factors built into the control loop. The functionally illustrated controller 23 of FIG. 1 includes amplifying circuitry 36 and part of the bridge.

Figure 4:
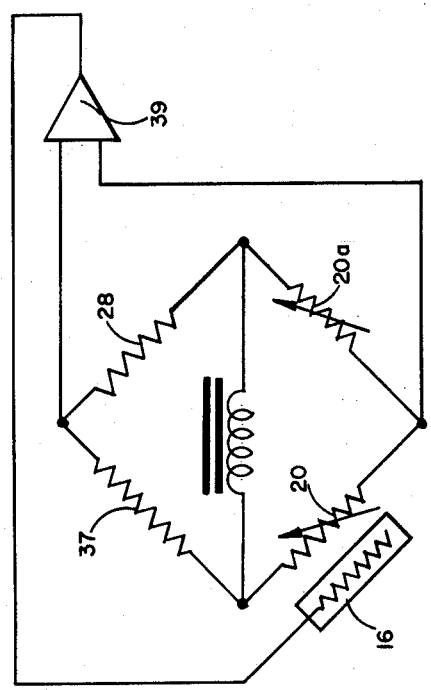
FIGS. 3 and 4 illustrate electrical connections of typical sensing bridges.

The two slave loops are substantially identical to the master loop except for the arrangement of the two sensing elements in the bridge. For example, as shown in FIGS. 1 and 4, the control of quadrant heater 16 is achieved by the use of a differential controller 24. This controller includes amplifying circuitry 39 and a bridge having a pair of fixed resistors 37, 38 and embodying the thermistors 20 and 20a in individual legs thereof. Thus, the output signal from this bridge has an amplitude proportional to the difference in temperature between the gyro portion immediately adjacent thermistor 20 and the gyro portion immediately adjacent thermistor 20a. The phase of this output of the bridge with respect to the phase of the bridge exciting signal depends upon the sense of the temperature difference between the two gyro portions controlled by thermistors 20 and 20a. Thus, the thermistors 20 and 20a sense the temperature differential between quadrants I and II and provide a signal to the differential controller 24 which energizes the heater 16 so as to slave the temperature of quadrant I to the temperature of quadrant II. Likewise, thermistors 21 and 21a are connected in an arrangement similar to that illustrated in FIG. 4 to sense the difference in temperature of quadrants III and IV and control the heater element 17 by means of a differential controller 25. While each slave loop may be utilized to provide a zero temperature differential by properly choosing the scale factors and initial balance of the slave sensing bridges, each slave or differential controller is also capable of establishing a fixed predetermined temperature differential between the quadrant and its reference quadrant.

Establishment of a fixed temperature differential is accomplished by unbalancing the bridge through adjustment of variable resistor 48 (FIG. 5) or by making resistors 37 and 38 (FIG. 4) unequal. For bridge balance to occur in this situation, thermistors 20 and 20a must be unbalanced in the same ratio as resistors 37 and 38, that is, $$\frac{R_{37}}{R_{38}} = \frac{R_{20}}{R_{20a}}$$

This requires the temperatures at thermistors 20 and 20a to be at a predetermined differential which causes the differential or unbalance between the thermistors. Such a predetermined temperature differential will apply a constant torque to the gyro and may be useful as a means of trimming gravity sensitive disturbing torques. Further, a control of the temperature of quadrants II and IV by master heater element 15 for a limited range may be useful for the purpose of trimming gyro fluid buoyancy and shifting the center of buoyancy of the floated element.

Each of the sensing bridges may be so balanced as to require an intermediate amount of power output to the heater with a zero temperature deviation so that temperature may be increased and decreased as desired. However, in many situations the temperature which is to be maintained is substantially above the environmental temperature whereby there is required but a unidirectional control system. In such an arrangement when the heater is de-energized the environmental temperature causes a decrease in temperature of the controlled element. When temperature drops below a predetermined stabilizing temperature, the control system operates to energize the heater and stabilize the system.

As illustrated in FIG. 5, each individual controller may comprise a temperature sensing bridge 40, a two-stage A.-C. amplifier 41, a demodulator 42, a pulse width modulator 43, and a power output stage 44. The several control loops will be identical except for the arrangement of the sensing bridges which differ as illustrated in connection with FIGS. 3 and 4. For the master loop the bridge is excited from an alternating-current source 45 which drives the primary 46 of a transformer 47 which has the secondary winding 33 thereof connected across the bridge. One output terminal 34 of the bridge is provided at the wiper of a potentiometer 48 for the purpose of adjusting the bridge balance. This bridge terminal is connected to the base of a first-stage transistor 49 of the A.-C. gain stage. Transistor 49 has its emitter connected to ground through resistors 50, 51 and capacitor 52. A potential, such as plus 28 volts, for example, is supplied through resistors 53, 54, ground resistor 55, and through the bridge. The bridge signal loop includes a relatively large capacitor 56 which is utilized to by-pass the power supply and obtain high gain of the signal. Any power supply noise remaining at the supply decoupling filter provided by resistor 53 and capacitor 52 is not amplified by transistor 49 since the same noise is applied to the transistor emitter by resistors 51 and 50 and to the transistor base via the bridge. It may be appreciated that if capacitor 56 is of sufficient capacity the entire bridge, resistor 50, and the transistor 49 will all float with respect to the power supply noise, and no amplification of this noise will occur. Thus the signal-to-noise ratio at the bridge is effectively increased by the gain of the first stage. Bias for transistor 49 is supplied by resistors 54 and 55 at the lower terminal of the sensing bridge rather than directly at the base of the transistor. Resistors 54 and 55 are outside of the input signal path which includes the bridge, the transistor base-to-emitter circuit, resistor 50, and capacitor 56. Thus, these resistors will not shunt the bridge and no signal shunting paths are present. The output of the first stage is developed across resistor 57 which is connected between ground and the collector of transistor 49 and is applied to the base of a second-stage transistor 60 having its emitter connected to the power supply through resistors 61, 62, having the junction therebetween grounded by a capacitor 63. It will be seen that the output of the first stage is developed across resistor 57 with respect to ground so the signal applied to the second stage 65 is by-passed to ground, again resulting in a maximum of power supply ripple suppression and a maximum of signal-to-noise gain. The output of the second stage is developed across resistor 64 connected between the collector of transistor 60 and ground. This A.-C. signal is then applied to the input of the demodulator 42.

The demodulator 42 comprises a transistor 65 having a resistor 66 and transformer secondary 67 connected between the base and emitter thereof. The secondary winding 67 may be an additional secondary winding on the same transformer which is excited by the source 45 whereby transistor 65 is cyclically turned on and off at the source frequency. The A.-C. input signal from the A.-C. gain stage 41 is applied to the demodulator at the emitter of the transistor whereby half-wave demodulation is provided at the collector. A smoothing capacitor 68 is coupled to the demodulator output whereby a relatively slowly varying D.-C. signal is provided from the demodulator. The D.-C. signal has a magnitude proportional to the amplitude of the input and a polarity relative to a predetermined reference potential which is indicative of the phase of the input signal. For example, the circuitry may be arranged so that the collector of the transistor demodulator is at plus 7 volts with a zero amplitude input signal. Thus, if the input to the demodulator is in phase with the reference source 45, the voltage at the capacitor will be above 7 volts, while if the two signals are out of phase, the voltage at the capacitor is somewhat below 7 volts. This slowly varying D.-C. control signal is fed to the input of a pulse width modulator 43.

The pulse width modulator generates a pulse whose width is proportional to the D.-C. signal from the demodulator stage. There is provided an input transistor 70 which operates to apply to a saturable core reactor 71 only those input signals which vary in a single sense from the predetermined level, such as 7 volts. The transistor 70 converts the input signal to a low impedance voltage source which is applied across an input winding 72 of the reactor 71. The lower end of winding 72 is connected to a source of supply voltage, such as plus 28 volts, for example, through transistor 73 and resistor 74. Transistor 73 is an input switching device having its base and emitter connected by resistor 75 and the secondary 76 of a transformer which has its primary excited by the source 45. Thus, transistor 73 is alternately switched on and off in synchronism with the bridge excitation, although it may be switched at other frequencies if the saturable reactor is designed for such other frequency. A zener diode 77 is connected between one end of resistor 74 and ground to provide at point 78 a fixed voltage, such as positive 7 volts, which is the potential about which the D.-C. input signal will vary.

The saturable reactor includes a saturating winding 80, a readout switch control winding 81, and an output winding 82, with all windings being poled as indicated by the solid dots in the drawing. A self-triggered readout switch is provided in the form of a transistor 83 having its collector coupled with one end of the saturating winding 80 and its base coupled by a resistor 84 to one end of the control winding 81. The other end of winding 80 is connected to ground, while the other end of winding 81 is connected to the point of fixed potential 78. If the self-triggered switch transistor 83 is of germanium, an additional diode 85 is provided to establish a small cut-off bias of about .6 volts for the transistor. Diode 85 may be eliminated if transistor 83 is of silicon.

Transistor 73 is turned alternately on and off at the input switching frequency by the operation of secondary winding 76 of the input transformer. When transistor 73 is off, the switch is open and no voltage is applied across the winding 72. When transistor 73 is on, the switch is closed and substantially the full potential at point 78 is applied at the lower end of winding 72. If at this time the input signal to transistor 70 is positive, that is, greater than 7 volts, the transistor is cut off, no voltage is applied across the winding 72 and no current flows through the winding. If the input voltage is negative, that is, below 7 volts, the current flows through the input winding and a voltage is induced across all windings such that all dotted terminals are negative and all non-dotted terminals are positive. In this situation, for example, current will flow from the lower end of output winding 82 to the upper end thereof. Thus, the end of winding 81 which is coupled with the base of transistor 83 is relatively positive and no base current flows, whereby the self-triggering switch 83 remains off. This condition obtains for the half-cycle of the input switching signal which may be designated as time $T_1$ as illustrated in FIG. 7. During this time $T_1$ voltage across any winding, such as winding 82, for example, is as illustrated by the curve under the time period $T_1$.

Assume that initially the core of the reactor is fully saturated. The core flux is at point "a" on the curve of FIG. 6. When the transistor 73 is turned on, the voltage at the input is applied across the input winding and the flux in the reactor core changes in accordance with Faraday's law. The flux change $\Delta\phi$ is expressed by $$\Delta\phi = 1/N_1 \int_0^{T_1} e_{in} dt \qquad (1)$$

wherein $N_1$ is the number of turns in the input winding 72. Normally the input voltage $e_{in}$ is a slowly varying signal compared to the repetition rate of the input switch 73, so that it may be assumed to be a direct-current signal. Thus, $$\Delta\phi = \frac{e_{in} T_1}{N_1} \qquad (2)$$

At the end of the period $T_1$ the flux level in the core will have reached some level, such as, for example, the point c on the hysteresis loop, and the current will be equal to the magnetizing current of the core. At this time the switch 73 is turned off and the current in the core drops to zero so that the operating point on the hysteresis loop now moves from point c to point d. In so doing there is a small flux reversal from c to d of $\Delta\phi'$. This flux reversal, in a direction opposite to the flux change from a to c, induces a voltage in all of the windings of the proper polarity to initiate conduction of the self-triggering switch 83. From another point of view it may be seen that when the input switch 73 is turned off, current continues to flow in the same direction in the coils due to the self-induction, and this changes the polarity of the potential across the several windings, causing at this time a positive potential to appear at all of the winding terminals designated by the solid dots.

With such a polarity in winding 81, that is, with the lower end thereof relatively negative, a base current of proper polarity is applied to the transistor 83 which then begins to conduct. Conduction of transistor 83 causes the transistor to be rapidly driven into saturation by means of the regenerative connection between windings 80 and 81, that is, conduction by the transistor through the saturating winding 80 causes the now negative lower terminal of winding 81 to go still further negative, thus applying more base driving current and increasing the conduction of the transistor. As the transistor 83 goes into saturation, the increased current through the saturating winding 80 causes the operating point on the hysteresis curve to move from $d$ to $e$, or, as illustrated in connection with FIG. 8, the transistor current which flows from emitter to collector of the self-triggering transistor rises to a point, such as point 90.

The time required for all of this to occur, going from point $c$ to point $e$, is quite small, on the order of microseconds, so that we now have the core unsaturated and the transistor conducting at saturation level. The 7-volt potential at point 78 is now applied to the saturating coil 80 since the voltage drop across the transistor 83 is relatively small while the core is unsaturated. The flux of the core now begins to move upwardly from point $e$ as the core starts to saturate in accordance with Faraday's law. The value of the voltage applied to the saturating winding 80 during this time is sufficient to drive the core from negative saturation to positive saturation in the full half-period $T_0$ (FIG. 7). For a flux change of less than twice $\phi_s$ (where $\phi_s$ is the saturating flux level) the saturating point is regained in some time $T_2$ which is less than $T_0$.

The change in flux when going from point $e$ back to saturation must be approximately equal to the original flux change from point $a$ to point $c$ since the core has returned to the positive saturation level. Thus, $$\Delta\phi = \frac{1}{N_2} \int_{T_2} e_{78} dt \quad (3)$$

$$\Delta\phi = \frac{e_{78} T_2}{N_2} \quad (4)$$

where $N_2$ is the number of turns of saturating winding 80 and $e_{78}$ is the voltage at point 78. Equating Equations 2 and 4 we get to $$\frac{e_{in} T_1}{N_1} = \frac{e_{78} T_2}{N_2} \quad (5)$$

Thus, $$T_2 = e_{in} \left( \frac{N_2 T_1}{N_1 e_{78}} \right) \quad (6)$$

$$= e_{in} K \quad (7)$$

which states that the pulse interval $T_2$ is directly proportional to the input signal.

When the flux level reaches the positive saturation level, the impedance of the core drops materially, and the transistor current rises, as indicated by the peak 91 in FIG. 8, to a value determined by the value of resistor 74 and the magnitude of the supply voltage. When the core saturates, its impedance drops and the core no longer limits the flow of current. Momentarily, the voltage at 78 falls toward zero, the voltage across resistor 74 increasing to account for the drop, and the voltage across the reactor windings drops toward zero. Resistor 74 limits the maximum current through winding 80. Thus, the base drive of the transistor decreases which reduces the current which the transistor 83 would have handled, whereby there is a regenerative turn off of the self-triggering transistor. As transistor 83 turns off, it blocks the supply current from point 78 through the saturable reactor and the 7 volts appear across transistor 83, this action occurring at the end of the period indicated as $T_2$ in FIG. 7. Thus, for the remainder of the time interval $T_0$ no voltage appears on any of the windings of the reactor. This cycle, as illustrated in FIG. 7, repeats itself when the input transistor 73 is next switched on.

One of the principal advantages of the self-triggering mode of operation of this pulse width modulator is that the output actually goes completely to zero. In previous modulators the readout voltage is switched on the core by an external switching supply in phase opposition to the read-in switching signal. Each time the readout voltage is applied, the core flux level rises from the remanence level $\phi_R$ to saturation level $\phi_S$. Then when this readout switch is turned off, the flux level drops back to $\phi_R$. This occurs even in the absence of an input and drops the flux level to provide the equivalent of a false input. During the next readout period an output pulse may appear. A minimum pulse width results with such readout switching. In the circuit described herein the flux level remains at the point $a$ (FIG. 6) when there is no input signal.

The output power stage comprises a transistor 92 having its emitter connected through resistor 93 to a source of heater power and its base and emitter connected to the output winding 82 of the pulse width modulator. The transistor-collector is connected to the heater 15. The power stage illustrated in FIG. 5 is useful for relatively low powers. The negative variable width pulses having a width linearly related to the input power amplifier at its A.-C. gain stage are utilized to switch on the power transistor 92. When the transistor is on, the signal from the supply source is applied to the heater, and the output will be a square pulse having width $T_2$ and an amplitude $V_P$, where $V_P$ is the voltage of the supply. The average voltage is $$E_{avo} = T_2 \frac{V_P}{2T_0}$$

$$= T_2 K_1$$

The power output is $$P = T_2 \frac{V_P^2}{R_L} \frac{1}{2T_0}$$

$$= T_2 K_2$$

Thus, it is seen that both average voltage output and power are linear functions of the interval $T_2$ which is directly proportional to the input signal.

For higher power outputs two transistors may be arranged in tandem as illustrated in FIG. 9. A first transistor 95 connected to be driven from the output winding 82 has its collector coupled to the collector of a secondary transistor 96 and has its emitter coupled to the base of transistor 96. The load 15 is connected to the collectors of both transistors.

With the circuit as described above, a maximum of 50 percent duty cycle is achieved. By supplying two pulse width modulators operating in push-pull, the duty cycle may be increased to a full 100 percent maximum, and an increase in power is obtained. Thus, as illustrated in FIG. 10, only a single power transistor is required. The demodulator 42 feeds a pulse width modulator 43 just as described in connection with FIG. 5. The demodulator also feeds a substantially identical pulse width modulator 43a which differs from the demodulator 43 solely in the phase of its input switching signal, that is, the signals fed to the input switching winding 76 of the input transistor 73 of the two pulse width modulators 43 and 43a are of mutually opposite phase so that the input signal is switched on alternate half-cycles. Output pulses are generated and each pulse width is modulated on alternate half-cycles as indicated by pulses 100, 101 for pulse width modulator 43 and pulses 102, 103 for pulse width modulator 43a. The pulses from modulator 43 are fed to drive a transistor 104, while the pulses from modulator 43a are fed to drive a transistor 105. Transistors 104 and 105 are connected in parallel to a single power transistor 106 which when switched on by the pulses applied to its base feeds the full supply voltage across the output heater coil 15. Thus, the pulses from the two pulse width modulators appear in the order indicated adjacent the heater load 15, that is, 100, 102, 101, and 103, to achieve a full 100 percent duty cycle.

Illustrated in FIG. 11 is an alternative form of power stage which will provide relatively high power, up to 1,000 watts, to the heater for those situations where linearity of the output may be sacrificed. In this arrangement the pulse width modulator output winding 82 is coupled between a source of negative potential, such as negative 25 volts, and a resistor 109 which is connected to the base of a transistor 107. The transistor 107 under the control of the pulse width modulator is utilized to switch a silicon controlled amplifier 108 having a control electrode connected to the collector of transistor 107 and to a source of positive potential, plus V, by a resistor 110. The output electrodes 111 and 112 of the silicon controlled rectifier are connected in series with a suitable source of current, such as 115 volts, 400 cycles per second, together with the heater 15. The silicon controlled rectifier is a rather simple and inexpensive device capable of handling large amounts of power. Such a device is manufactured by General Electric Company, under the designation Type C35C, suitable for application in the described temperature control system. These rectifiers are described in General Electric Company paper ECG–327, published at Clyde, New York, June 1958, "Application Notes for ZJ–39A (C35C) Silicon Controlled Rectifier."

In operation of the power stage of FIG. 11, the output pulse from the pulse width modulator causes conduction of the transistor 107 which in turn transmits a turn-on voltage to the control electrode of the silicon controlled rectifier. With the turn-on voltage thus applied, the silicon rectifier becomes a closed switch feeding the full A.-C. supply signal across the heater. The silicon controlled rectifier is triggered at some point during the positive half-cycle of A.-C. power, the unit saturates and permits the supply voltage to appear across the load. Once triggered the unit continues to conduct until the supply voltage goes to zero.

There has been described a temperature control system of improved linearity and efficiency which is capable of substantially minimizing temperature differences between different parts of a precision instrument or other apparatus to be temperature stabilized. The control system is particularly characterized by the incorporation therein of a specified linear temperature control amplifier utilizing an improved pulse width modulator which itself enables the achievement of improved efficiency and linearity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A temperature control system for a temperature sensitive device comprising a first controlling means for establishing the temperature of one portion of said device at a preselected value, and a second controlling means referenced from the temperature of said one portion for establishing the temperature of a second portion of said device in accordance with the temperature of said one portion, each said controlling means comprising an A.-C. excited temperature sensitive bridge, an amplifier responsive to said bridge, a phase-sensitive demodulator responsive to said amplifier, pulse width modulating means responsive to said demodulator for generating output pulses having a width linearly related to the output of said demodulator, a power amplifier connected to be energized by said pulses, whereby the power output of said power amplifier is a linear function of temperature variation sensed by said bridge, and a heater connected to be energized by said power amplifier.

2. A temperature control system for a temperature sensitive device comprising a first controlling means for establishing the temperature of one portion of said device at a preselected value, and a second controlling means referenced from the temperature of said one portion for establishing the temperature of a second portion of said device in accordance with the temperature of said one portion, each said controlling means comprising an A.-C. excited temperature sensitive bridge, an amplifier responsive to said bridge, a phase-sensitive demodulator responsive to said amplifier, a saturable core reactor having first and second control windings and input and output windings, switch means for repetitively applying and removing the output of said demodulator to said input winding, a source of supply potential, a transistor having a pair of output electrodes and a control electrode, said output electrodes being connected in circuit with said source and first winding, said second winding being connected in circuit with said control electrode and said source, a power amplifier connected to be energized by said output winding, whereby the power output of said power amplifier is a linear function of temperature variation sensed by said bridge, and a heater connected to be energized by said power amplifier.

3. A temperature control system comprising an A.-C. excited temperature sensitive bridge, an amplifier responsive to said bridge, a phase-sensitive demodulator responsive to said amplifier, a saturable core reactor having first and second control windings and input and output windings, switch means for repetitively applying and removing the output of said demodulator to said input winding, a source of supply potential, a transistor having a pair of output electrodes and a control electrode, said output electrodes being connected in circuit with said source and first winding, said second winding being connected in circuit with said control electrode and said source, a power amplifier connected to be energized by said output winding, whereby the power output of said power amplifier is a linear function of temperature variation sensed by said bridge, and a heater connected to be energized by said power amplifier.

4. A temperature controlled system comprising an A.-C. excited temperature sensitive bridge having first and second temperature sensitive elements in first and second legs thereof, said elements being mutually spaced to sense temperatures of different portions of a device to be temperature controlled, an amplifier responsive to said bridge, a phase-sensitive demodulator responsive to said amplifier, pulse width modulating means responsive to said demodulator for generating output pulses having a width linearly related to the output of said demodulator, a power amplifier connected to be energized by said pulses, whereby the power output of said power amplifier is a linear function of temperature variation sensed by said bridge, a heater connected to be energized by said power amplifier and situated near said first temperature sensitive element, and independent means for controlling temperature adjacent said second temperature sensitive element.

5. A temperature control system comprising an A.-C. excited temperature sensitive bridge, an amplifier responsive to said bridge, a phase-sensitive demodulator responsive to said amplifier, pulse width modulating means responsive to said demodulator for generating output pulses having a width linearly related to the output of said demodulator, a power amplifier connected to be energized by said pulses, whereby the power output of said power amplifier is a linear function of temperature variation sensed by said bridge, and a heater connected to be energized by said power amplifier.

6. Temperature stabilized apparatus comprising a member having a first heater situated adjacent a first area thereof, a second heater situated adjacent a second area thereof, first control means for sensing temperature of said first area and operating said heater accordingly, a second control means for operating said second heater in accordance with the temperature of said second area relative to a first portion of said first area, said second control means including a bridge having first and second temperature sensing devices connected in a pair of legs thereof, said devices being respectively situated adjacent said first and second areas whereby said first area is temperature stabilized and said second area is temperature slaved to said first area.

7. The apparatus of claim 6 wherein said second control means comprises a pulse width modulator, demodulating means for coupling the output of said bridge to said modulator, and means for driving said second heater from the output of said pulse width modulator.

8. A pulse width modulator comprising a saturable core reactor having a saturating winding and a readout switch control winding, means for applying to and removing from said windings a magnetomotive force representative of an input modulating signal, a source of supply potential, readout switch means responsive to potential induced in said control winding by removal of said magnetomotive force for supplying a core saturating current to said saturating winding from said source, said readout switch means being responsive to saturation of said reactor for decoupling said saturating winding from said source.

9. A pulse width modulator comprising a saturable core reactor having a saturating winding, means for applying to and removing from said winding a magnetomotive force indicative of an input modulating signal, a source of supply potential, and readout switching means coupled between said winding and said source and operable in response to removal of said magnetomotive input force from said core for coupling said source to said winding to effect saturation of said core, said readout switching means including means responsive to saturation of said core for decoupling said source from said winding.

10. A pulse width modulator comprising a saturable core reactor having a saturating winding and a control winding, means for applying to and removing from said windings a magnetomotive force indicative of an input modulating signal, a source of supply potential, and readout switching means coupled between said windings and said source and operable in response to removal of said magnetomotive input force to said core for coupling said source to said windings to effect saturation of said core, said readout switching means comprising a transistor having a collector electrode coupled with said saturating winding and an emitter electrode coupled with said source, and having a base electrode coupled with said control winding.

11. A pulse width modulator comprising a saturable core reactor, input switching means for applying and removing a modulating signal to and from said reactor at a predetermined repetition rate; core saturating means comprising a saturating winding on the core, a readout switch and a source of potential, all connected in circuit; a switch control winding on said core for closing said switch when said input signal is removed and while said core is being saturated; said readout switch in circuit with said saturating winding being responsive to saturation of said core to decrease the potential across said windings whereby said switch is opened and said saturating winding is decoupled from said source.

References Cited in the file of this patent

UNITED STATES PATENTS

| | | |
|---|---|---|
| 2,780,782 | Bright | Feb. 5, 1957 |
| 2,843,714 | Stanton | July 15, 1958 |
| 2,944,137 | Kaltenbach | July 5, 1960 |
| 2,957,111 | Schaeve et al. | Oct. 18, 1960 |
| 2,994,840 | Dorsman | Aug. 1, 1961 |
| 2,998,195 | Kahn | Aug. 29, 1961 |